(12) United States Patent
Tajima et al.

(10) Patent No.: US 6,715,926 B2
(45) Date of Patent: Apr. 6, 2004

(54) WHEEL BEARING ASSEMBLY (75) Inventors: Eiji Tajima, Shizuoka (JP); Akira Torii, Shizuoka (JP); Masuo Takaki, Osaka (JP)

(73) Assignee: NTN Corporation, Osaka (JP)

( * ) Notice: Subject to any disclaimer, the term of this patent is extended or adjusted under 35 U.S.C. 154(b) by 15 days.

(21) Appl. No.: 09/900,877

(22) Filed: Jul. 10, 2001

(65) Prior Publication Data
US 2003/0012474 A1 Jan. 16, 2003

(51) Int. Cl.$^7$ ............................................. F16C 13/00
(52) U.S. Cl. ........................ 384/544; 384/589; 384/625
(58) Field of Search ................................ 384/544, 589, 384/625

(56) References Cited

U.S. PATENT DOCUMENTS

| | | | | |
|---|---|---|---|---|
| 4,113,328 A | * | 9/1978 | Vander Meulen | 384/482 |
| 5,143,458 A | * | 9/1992 | Alff et al. | 384/448 |
| 5,567,058 A | * | 10/1996 | Morita et al. | 324/174 |
| 5,607,241 A | | 3/1997 | Fukumura | 384/537 |
| 5,852,361 A | * | 12/1998 | Ouchi et al. | 324/174 |
| 5,975,767 A | * | 11/1999 | Mizukoshi et al. | 277/321 |
| 6,012,986 A | * | 1/2000 | Guimbretiere | 301/124.1 |
| 6,070,325 A | * | 6/2000 | Miyata et al. | 29/407.05 |
| 6,089,757 A | * | 7/2000 | Ouchi | 384/448 |
| 6,127,819 A | * | 10/2000 | Ouchi | 324/173 |
| 6,146,022 A | * | 11/2000 | Sahashi et al. | 384/544 |
| 6,217,220 B1 | | 4/2001 | Ohkuma et al. | 384/489 |

FOREIGN PATENT DOCUMENTS

| | | |
|---|---|---|
| EP | 1 077 142 | 2/2001 |
| FR | 2 795 021 | 12/2000 |
| WO | 01/48390 | 7/2001 |

* cited by examiner

*Primary Examiner*—David A. Bucci
*Assistant Examiner*—Julie K. Smith
(74) *Attorney, Agent, or Firm*—Wenderoth, Lind & Ponack, L.L.P.

(57) ABSTRACT

A wheel bearing assembly is provided which can prevent lowering of the life of a bearing assembly due to entry of muddy water into the bearing assembly through a gap between fitting surfaces of a first inner member and a second inner member. These members are rotatably supported by mounting rolling elements between double-row raceways formed on an inner peripheral surface of an outer member and raceways formed on outer peripheral surfaces of the first and second inner members. A stem formed on the second inner member is inserted into a hole formed in the first inner member, and a tip of the stem is caulked to hold the first and second inner members in a coupled state. An annular groove is formed in an outer periphery of the stem. A seal ring is mounted in the annular groove.

32 Claims, 7 Drawing Sheets

WHEEL BEARING ASSEMBLY

BACKGROUND OF THE INVENTION

This invention relates to a wheel bearing assembly for supporting a vehicle wheel, and particularly to an arrangement for providing a seal for between fitting surfaces of first and second inner members.

Figure 9:
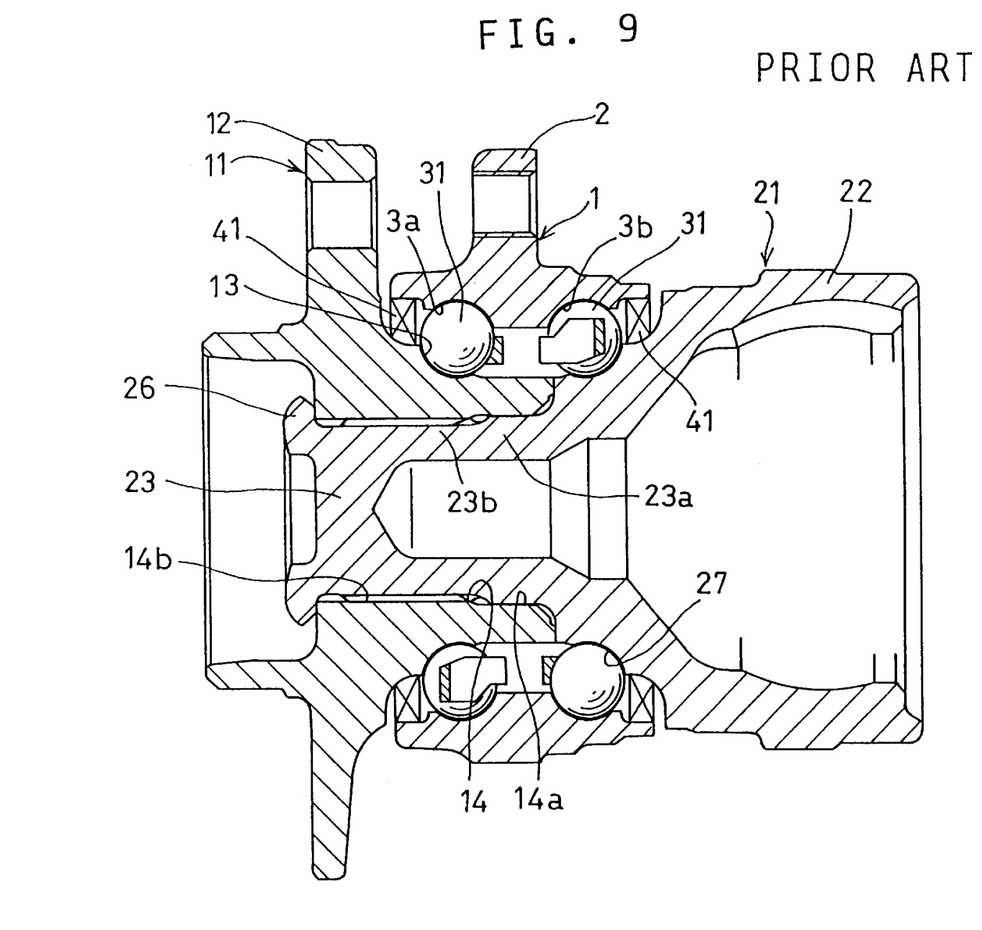
FIG. 9 is a vertical sectional front view showing a conventional wheel bearing assembly.

As a wheel bearing assembly for a driving wheel, one as shown in FIG. 9 is known. This wheel bearing assembly comprises an outer member 1, a first inner member 11 and a second inner member 21, and double-row rolling elements 31 for supporting the outer member 1 and the first and second inner members 11 and 21 so as to be rotatable relative to each other.

The outer member 1 has on its outer periphery a flange 2 for mounting to a vehicle body, and has on its inner periphery double-row raceways 3a, 3b.

The first inner member 11 is formed on its outer periphery with a wheel-mounting flange 12 for supporting a driving wheel, and a raceway 13 opposing raceway 3a. Also, the first inner member 11 is formed with a stem-inserting hole 14 extending therethrough. The hole 14 comprises a fitting hole portion 14a and a spline hole portion 14b.

The second inner member 21 comprises an outer joint member of a constant-velocity joint provided with a stem 23 at a closed end of its mouth portion 22. On an outer periphery of the second inner member 21, a raceway 27 is formed so as to oppose the raceway 3b. Also, the second inner member 21 has the stem 23 which is formed with a fitting shaft portion 23a fitted into the fitting hole portion 14a, and a spline shaft portion 23b fitted in the spline hole portion 14b.

The stem 23 of the second inner member 21 is inserted in the stem-inserting hole 14 of the first inner member 11, and by caulking a tip of the stem 23 the first and second inner members 11 and 21 are coupled together. Numeral 26 shows a caulked portion.

Double-row rolling elements 31 are mounted between the double-row raceways 3a, 3b, and the raceways 13, 27, of the first and second inner members 11 and 21. By caulking the tip of the stem 23 with a pre-load applied between the double-row rolling elements 31 and the raceways 3a, 3b, 13, 27, the wheel bearing assembly is assembled.

Seal members 41 are mounted at both ends of the outer member 1 on its inner periphery. The seal members 41 provide a seal between the outer member 1 and the first and second inner members 11 and 21 to prevent muddy water and foreign matter from entering into the bearing assembly.

Automobiles, particularly RVs (recreational vehicles), provided with a conventional wheel bearing assembly sometimes travel on snow-covered roads, mountain roads and bad roads. In such a case, although a seal is provided between opposed portions of the outer member 1 and the first and second inner members 11 and 21 by the seal members 41, it is necessary to take measures to prevent entry of muddy water or dirt into the bearing assembly through fitting surfaces of the first inner member 11 and the second inner member 21.

An object of this invention is to provide a bearing assembly which is superior in sealing properties and prevents entry of muddy water, thereby increasing the life of the bearing assembly.

SUMMARY OF THE INVENTION

According to this invention, there is provided a wheel bearing assembly comprising an outer member having a flange, for mounting to a vehicle body, on an outer periphery of the outer member. The outer member is also formed with two raceways on its inner periphery. The wheel bearing assembly also comprises a first inner member having on its outer periphery a wheel-mounting flange and a raceway opposing one of the two raceways on the outer member, and a second inner member having on its outer periphery a raceway opposing the other of the two raceways. The second inner member is coupled to the first inner member, and double-row rolling elements are mounted between the outer member and the first and second inner members. The wheel bearing assembly also comprises a pair of seal members for providing a seal between both ends of the inner periphery of the outer member and the outer peripheries of the first and second inner members. And, the wheel bearing assembly further comprises a sealing member for providing a seal for between the first inner member and the second inner member.

By providing the sealing member for providing a seal for between fitting surfaces of the first and second inner members, it is possible to prevent entry of muddy water into the bearing assembly through a gap between the fitting surfaces. Thus, traveling on a bad road having much muddy water, in an RV will not lower the life of bearing assembly.

The sealing member may comprise a seal ring mounted in an annular groove formed in at least one of fitting surfaces between the first inner member. The seal ring is mounted in the annular groove so as to be in resilient contact with the other of the fitting surfaces. The sealing member may alternatively comprise a seal member mounted on one of opposed end faces of the first and second inner members, with the seam member having a plurality of seal lips in resilient contact with the other end face. With the sealing member comprising such a seal member, it is possible to provide a seal at contact portions between the plurality of seal lips and the other end face, and thus an extremely high degree of sealing is assured.

Also, the sealing member may comprise a seal cap mounted on one end of the second inner member protruding outwardly beyond an outer end face of the first inner member, with the seal cap having a seal lip in resilient contact with the outer end face of the first inner member to cover an opening of a hole formed in the first inner member. With this arrangement, since the seal cap can be mounted after the wheel bearing assembly has been assembled, assembling work is easy. Further, a sealing agent may be applied to fitting surfaces between the first and second inner members. By using such a sealing agent, it is possible to fill a gap at the fitting portion, and thus a high degree of sealing is achieved.

In the wheel bearing assembly according to this invention, the second inner member may be an outer joint member of a constant-velocity joint having a stem formed with a fitting shaft portion pressed into a fitting hole portion of a stem-inserting hole formed in the first inner member, and also formed with a spline shaft portion inserted into a spline hole portion of the stem-inserting hole. If the outer joint member is the second inner member, it is integrated with a constant-velocity joint, and thus it is possible to reduce weight and axial length of the wheel bearing assembly.

In the wheel bearing assembly according to this invention, the second inner member may be an inner ring pressed on a small diameter bearing ring fitting surface formed on the outer periphery of the first inner member at one end thereof.

Other features and objects of the present invention will become apparent from the following description made with reference to the accompanying drawings, in which:

DETAILED DESCRIPTION OF THE PREFERRED EMBODIMENTS

Figure 1:
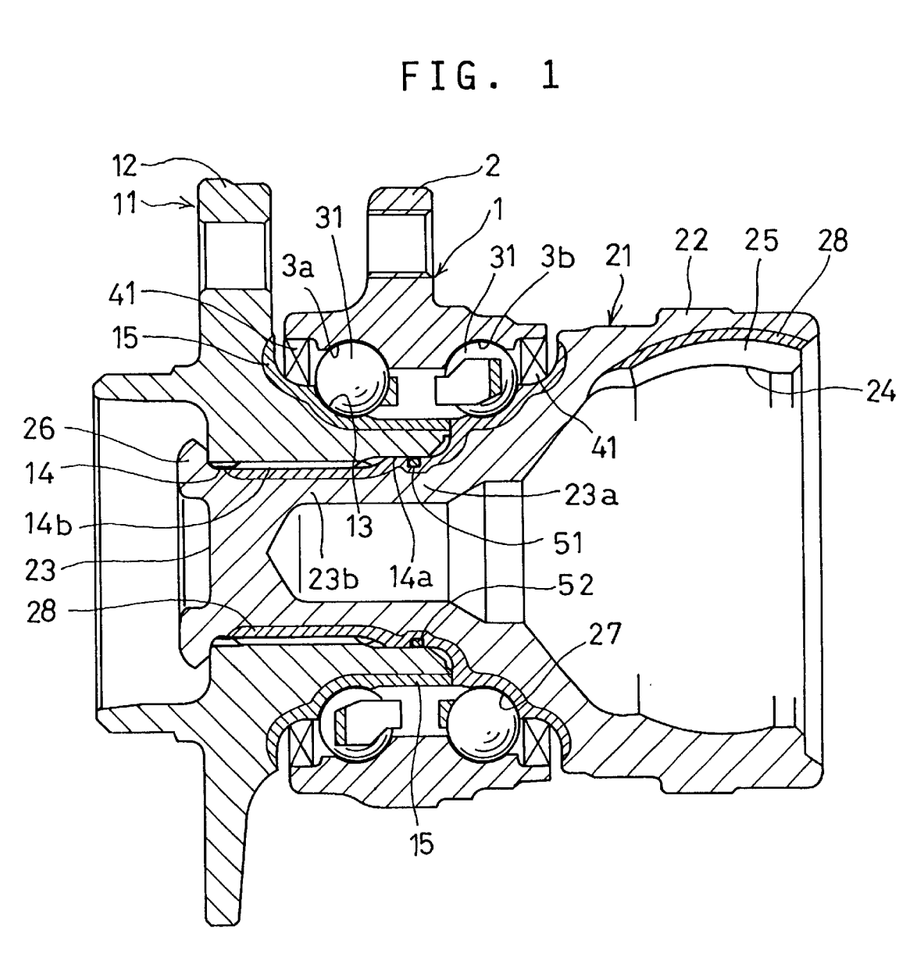
FIG. 1 is a vertical sectional front view of a wheel bearing assembly of a first embodiment of this invention.

Hereinbelow, embodiments of this invention will be described with reference to FIGS. 1 through 8. FIG. 1 shows a first embodiment of a wheel bearing assembly according to this invention. The wheel bearing assembly comprises an outer member 1, a first inner member 11, a second inner member 21 and double-row rolling elements 31.

The outer member 1 has on its outer periphery a flange 2 to be mounted to a vehicle body. On an inner periphery of the outer member 1, double-row raceways 3a and 3b are formed.

The first inner member 11 comprises a hub ring. On its outer peripheral surface, a wheel-mounting flange 12 and a raceway 13 opposing raceway 3a on the outer member 1 are formed. Also, the first inner member 11 has an axial stem-inserting hole 14 extending therethrough from its inner side end to its outer side end. The stem-inserting hole 14 consists of a fitting hole portion 14a and a spline hole portion 14b.

The inner side refers to a side located inwardly in a width direction of a vehicle body with the wheel bearing assembly mounted on the vehicle body, and is on the right side of each figure. Conversely, the outer side refers to a side located outwardly in the width direction and is on the left side of each figure.

The second inner member 21 comprises an outer joint member of a constant-velocity joint provided with a stem 23 on a closed end of its mouth portion 22. Curved track grooves 25 are formed in a spherical inner surface 24 formed on the mouth portion 22.

The stem 23 is provided with a spline shaft portion 23b and a fitting shaft portion 23a which is pressed into the fitting hole portion 14a formed in the first inner member 11. On the other hand, the spline shaft portion 23b is fitted into the spline hole portion 14b.

The first inner member 11 and the second inner member 21 are held in a coupled state by caulking a tip of the stem 23 at a portion 26.

A raceway 27 is provided on an outer periphery of the closed end portion of the mouth portion 22 of the second inner member 21 so as to oppose raceway 3b on the outer member 1. The double-row rolling elements 31 are mounted between the raceways 3a, 3b of the outer member 1 and the raceways 13 and 27 formed on the first and second inner members 11 and 21, respectively. By caulking the tip of the stem 23 with a pre-load imparted between the rolling elements 31 and the raceways 3a, 3b, 13 and 27, the wheel bearing assembly is assembled.

Seal members 41 are mounted at both ends of the outer member 1 on its inner periphery. The seal members 41 provide seals between opposed portions of the outer member 1 and the first and second inner members 11 and 21 to prevent entry of muddy water and foreign matter into the bearing assembly.

Because the first inner member 11 and the second inner member 21 are connected together by fitting the stem 23 provided on the second inner member 21 into the stem-inserting hole 14 formed in the first inner member 11, reliability of seal between contacting fitting surfaces is not high, so that muddy water may enter through a gap between the fitting surfaces and lower the life of the bearing assembly.

Figure 2:
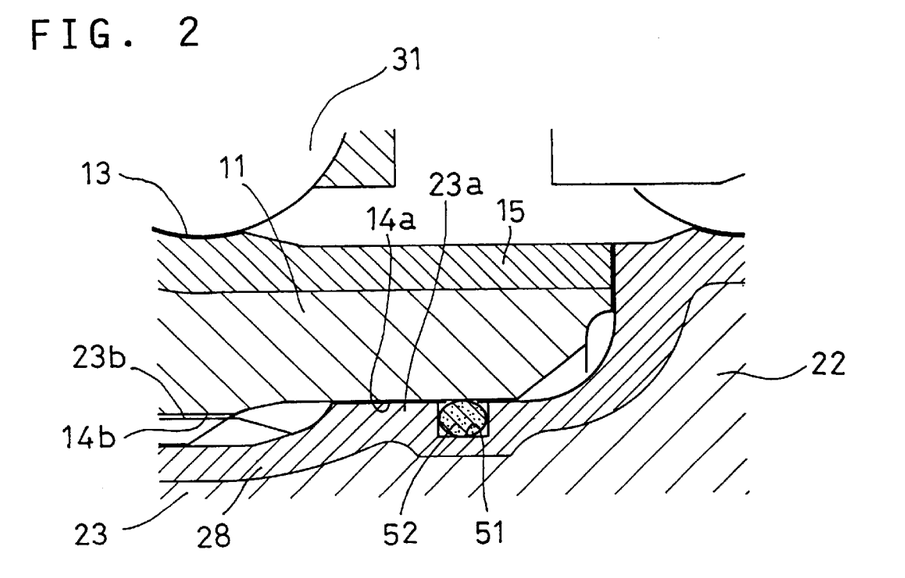
FIG. 2 is an enlarged sectional view showing a portion of the wheel bearing assembly of FIG. 1.

In order to avoid such trouble, a sealing member for providing a seal for between the fitting surfaces is provided between the first inner member 11 and the second inner member 21. As the sealing member, as shown in FIG. 2, a sealing ring 52 is mounted in an annular groove 51 formed in an outer peripheral surface of the fitting shaft portion 23b of the stem 23. The seal ring 52 is mounted in the annular groove 51 so as to be resiliently brought into contact with an inner peripheral surface of the fitting hole portion 14a formed in the first inner member 11, while at the same time being in contact with a bottom surface of the groove.

The seal ring 52 is preferably formed of a material that is less likely to deteriorate and is superior in durability so that a seal between the contacting fitting surfaces of the first inner member 11 and the second inner member 21 can be maintained for a long time. As such materials, nitrile rubber, fluororubber, acrylic rubber, silicone rubber, chloroprene rubber, and the like may be used.

As described above, by mounting the seal ring 52 in the annular groove 51 formed in the outer peripheral surface of the fitting shaft portion 23a so as to provide a seal between the fitting surfaces of the first and second inner members 11 and 21, entry of muddy water into the bearing assembly through a gap between the fitting surfaces can be prevented to avoid lowering of the life of the bearing assembly.

In the embodiment shown in FIG. 1, the seal ring 52 is mounted on the fitting shaft portion 23a of the stem 23 of the second inner member 21. However, the sealing ring 52 may be mounted in an annular groove formed in the inner peripheral surface of the fitting hole portion 14a of the first inner member 11.

The first inner member 11 is formed by forging carbon steel whose carbon content is preferably 0.45–1.10 wt %, more preferably 0.45–0.75 wt %. After formation, its surface is subjected to a hardening treatment such as induction hardening, carburizing hardening or laser hardening to increase hardness. Numeral 15 shows a hardened layer.

Hardening is carried out over a range from a surface of a root portion of the wheel-mounting flange 12 to the inner-side end of the first inner member 11. A surface hardness should be about Hv 500–900. Also, a hardened depth of the hardened layer 15 is preferably about 0.7–4 mm at the raceway 13, and about 0.3–3 mm at other portions.

By providing the hardened layer 15 to have a large depth at the position of the raceway 13, rolling fatigue life of the raceway 13 can be assured. The rolling fatigue life is assured by hardening the first inner member 11 made of carbon steel having the carbon content of at least 0.45 wt %. If the first inner member is made of carbon steel having a carbon content of less than 0.45 wt %, required hardness could not be obtained even if a hardening treatment is carried out.

Also, by hardening the surface at the root portion of the wheel-mounting flange 12, the wheel-mounting flange can be prevented from deforming or running out due to moment loads from a wheel mounted on the wheel-mounting flange. Also, frictional resistance at contact positions of the seal members 41 decreases, so that expected sealing effects are realized and wear resistance improves.

The second inner member 21 is made of carbon steel having a carbon content of preferably 0.45–1.10 wt %, more preferably 0.45–0.75 wt %, and is hardened after forming by forging.

The second inner member 21 is hardened from a shoulder portion of the mouth portion 22 to the tip of the stem 23, and for an entire inner surface of the track grooves 25 formed in the mouth portion 22. Surface hardness of these hardness portions is about Hv 500–900. Numeral 28 shows the hardened layer.

The tip of the stem 23 is subjected to caulking. If surface hardness of the tip is over Hv 300, when the tip is caulked, cracks may develop in the caulked portion 26, or a coupling force provided to the first and second inner members 11, 21 may be insufficient because of poor caulking. Thus, the tip of the stem 23 is left unhardened. Specifically, by keeping a surface hardness of the tip within a range of Hv 200–300, ductility is ensured to permit caulking.

A hardened depth of the hardened layer 28 is about 0.7–4 mm at positions of the track grooves 25 and the raceway 27, and shallower at other portions, e.g. about 0.3–3 mm.

By providing the hardened layer 28 to have a large depth at the positions of the track grooves 25 and the raceway 27, rolling fatigue life of the surface of the track grooves 25 and the raceway 27 can be assured.

By hardening a surface of the stem 23, it is possible to prevent torsional deformation of the stem 23 during torque transmission, and to improve creep resistance and fretting resistance of the fitting shaft portion 23a and the spline shaft portion 23b.

With the wheel bearing assembly of the first embodiment shown in FIG. 1, by caulking the tip of the stem 23, the first inner member 11 and the second inner member 21 are held in a coupled state. But the coupling of the first inner member 11 to the second inner member 21 is not limited to a caulking operation. For example, by providing a threaded portion at the tip of the stem 23 and tightening a nut onto the threaded portion, the first inner member and the second inner member may be coupled.

Figure 3:
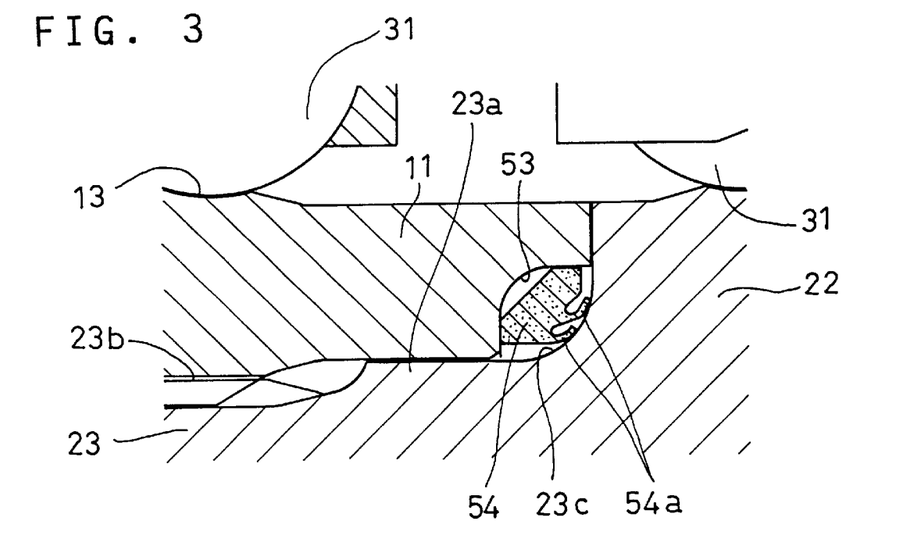
FIG. 3 is a sectional view showing a sealing member of a second embodiment.
Figure 4A:
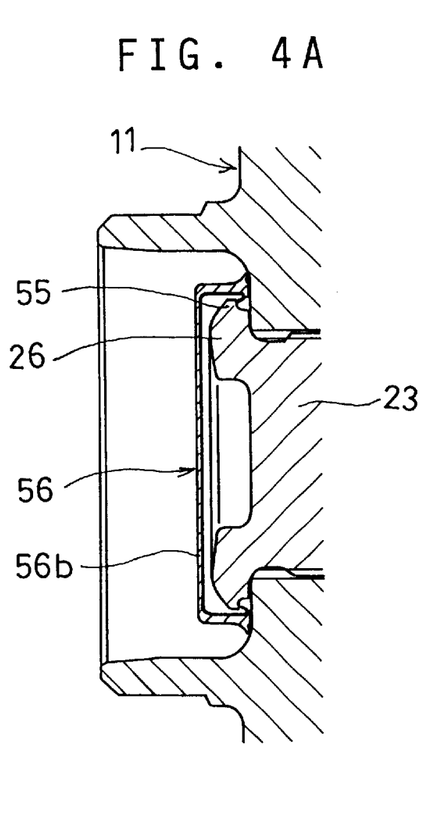
FIGS. 4A to 4C are sectional views of a sealing member of a third embodiment.
Figure 4B:
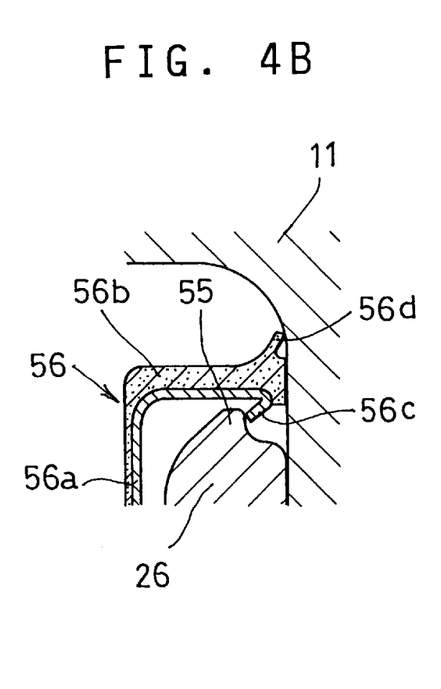
Figure 4C:
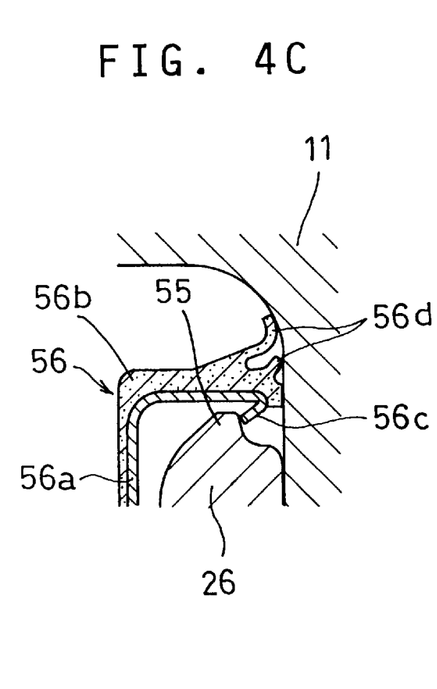
Figure 5A:
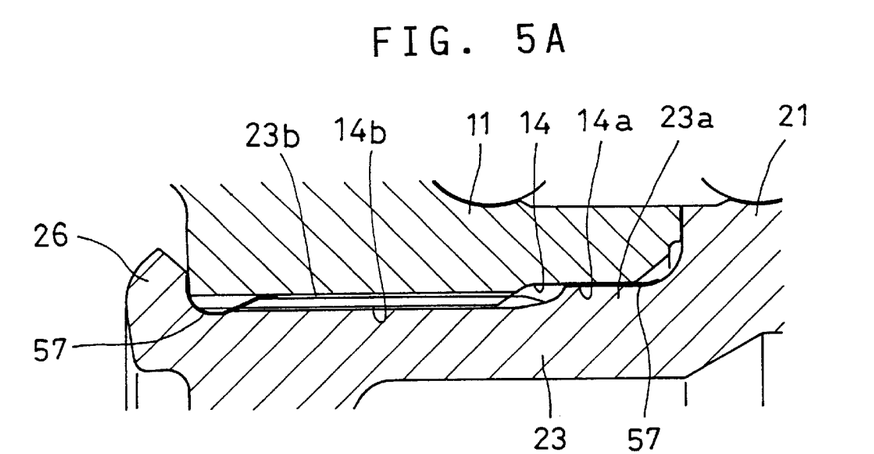
FIGS. 5A to 5C are sectional views of sealing member of a fourth embodiment.
Figure 5B:
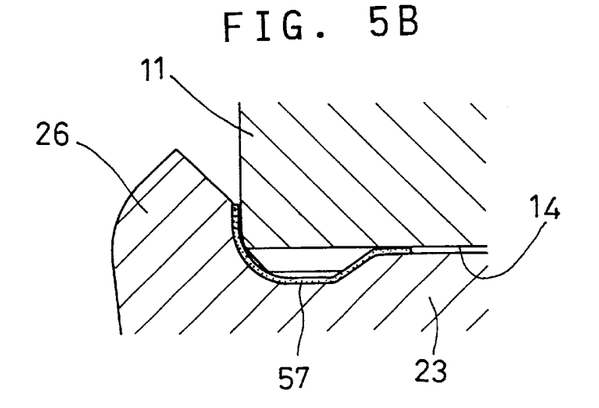
Figure 5C:
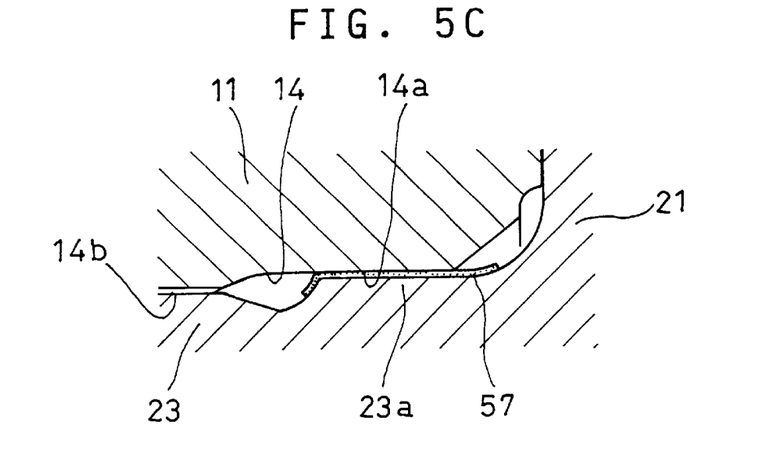

FIGS. 3 through 5 are enlarged views of sealing members in second to fourth embodiments of the wheel bearing assembly according to this invention. Since the second to fourth embodiments differ from the wheel bearing assembly shown in FIG. 1 only with regard to the sealing member for providing a seal for between fitting surfaces of first inner member 11 and second inner member 21, only the sealing members of the second to fourth embodiments will be described below.

As the sealing member of the wheel bearing assembly in the second embodiment shown in FIG. 3, a seal member 54 is mounted in a seal-mounting recess 53 formed in an inner peripheral surface of the first inner member 11 at its inner-side end. The seal member 54 is mounted in the seal-mounting recess 53, e.g. with an adhesive, and a plurality of seal lips 54a formed on the seal member 54 are resiliently brought into contact with an arcuate surface 23c formed at a root of stem 23.

Also, instead of being bonded via an adhesive, the seal member 54 may be fitted into the seal-mounting recess 53 with a slight interference provided between an inner periphery of the seal-mounting recess 53 and the seal member 54. As the seal member 54, one made of nitrile rubber, fluororubber, acrylic rubber, silicone rubber, chloroprene rubber, and the like may be used. In FIG. 3, two seal lips 54a are shown on the seal member 54, but one or two radially extending seal lips may be added.

As the sealing member of the wheel bearing assembly in the third embodiment shown in FIGS. 4A to 4C, a seal cap 56 is mounted on an annular protrusion 55 provided on an outer periphery of caulked portion 26 formed at the tip of stem 23.

The seal cap 56 comprises a resilient seal member 56b such as rubber fixed, by baking or bonding, to a surface of a cap body 56a in the form of a metal plate, an inwardly extending engaging piece 56c formed at an open end of the cap body 56a, and a seal lip 56d provided on an open end of the seal member 56b. As shown in FIG. 4B, the seal lip 56d may be one, or as shown in FIG. 4C, may be two, or may be three though not shown.

The seal cap 56 is fitted on the caulked portion 26 and is held in a mounted state by engagement of the engaging piece 56c with the protrusion 55. Also, the seal cap 56 covers the entire opening of the outer-side end of the stem-inserting hole 14 formed in first inner member 11 by resilient contact of the seal lip 56d with an outer end face of the first inner member 11 to provide a seal for contacting fitting surfaces between the first inner member 11 and the stem 23.

With the sealing member of the wheel bearing assembly in the fourth embodiment shown in FIGS. 5A to 5C, a sealing agent 57 is applied to an outer periphery of stem 23 at its tip, and also to an outer periphery of fitting shaft portion 23a, provide a seal to seal between fitting surfaces of the stem 23 and first inner member 11. FIG. 5B is an enlarged view of the tip of the stem 23, and FIG. 5C is an enlarged view of the fitting shaft portion 23a of the stem 23. In these figures, a thickness of the sealing agent 57 is shown rather exaggeratedly. As the sealing agent 57, a resin adhesive is preferable, and an anaerobic room temperature curing type adhesive is more preferable. If a resin adhesive is employed as the sealing agent 57, since it completely fills fine recesses produced due to surface roughness of the stem 3 and an inner peripheral surface of the stem-inserting hole 14, extremely high sealing properties can be achieved.

Also, since an anaerobic room temperature curing type adhesive is slow with regard to curing speed even in contact with air, but cures quickly at room temperature even without contacting air, it is possible to reduce a fitting interference between the fitting hole portion 14a of the first inner member 11 and the fitting shaft portion 23a of the stem 23. Thus, the bearing assembly is easier to assemble.

As the anaerobic room temperature curing type adhesive, Loctite lifting compound 680 and Loctite 603 made by Henkel Japan Ltd. may be used. The sealing agent 57 may be applied only to an outer periphery of the tip of the stem 23 as shown in FIG. 5B, or it may be applied only to an outer periphery of the fitting shaft portion 23a as shown in FIG. 5C. Further, although not shown, the sealing agent may be applied to the stem-inserting hole 14, or it may be applied to an outer periphery of spline shaft portion 23b.

With any of the sealing members shown in FIGS. 3–5, a seal is assured for between fitting surfaces of first inner member 11 and stem 23 formed on second inner member 21. Thus, entry of muddy water, for example, into the bearing assembly through a gap between the fitting surfaces is prevented.

Figure 6:
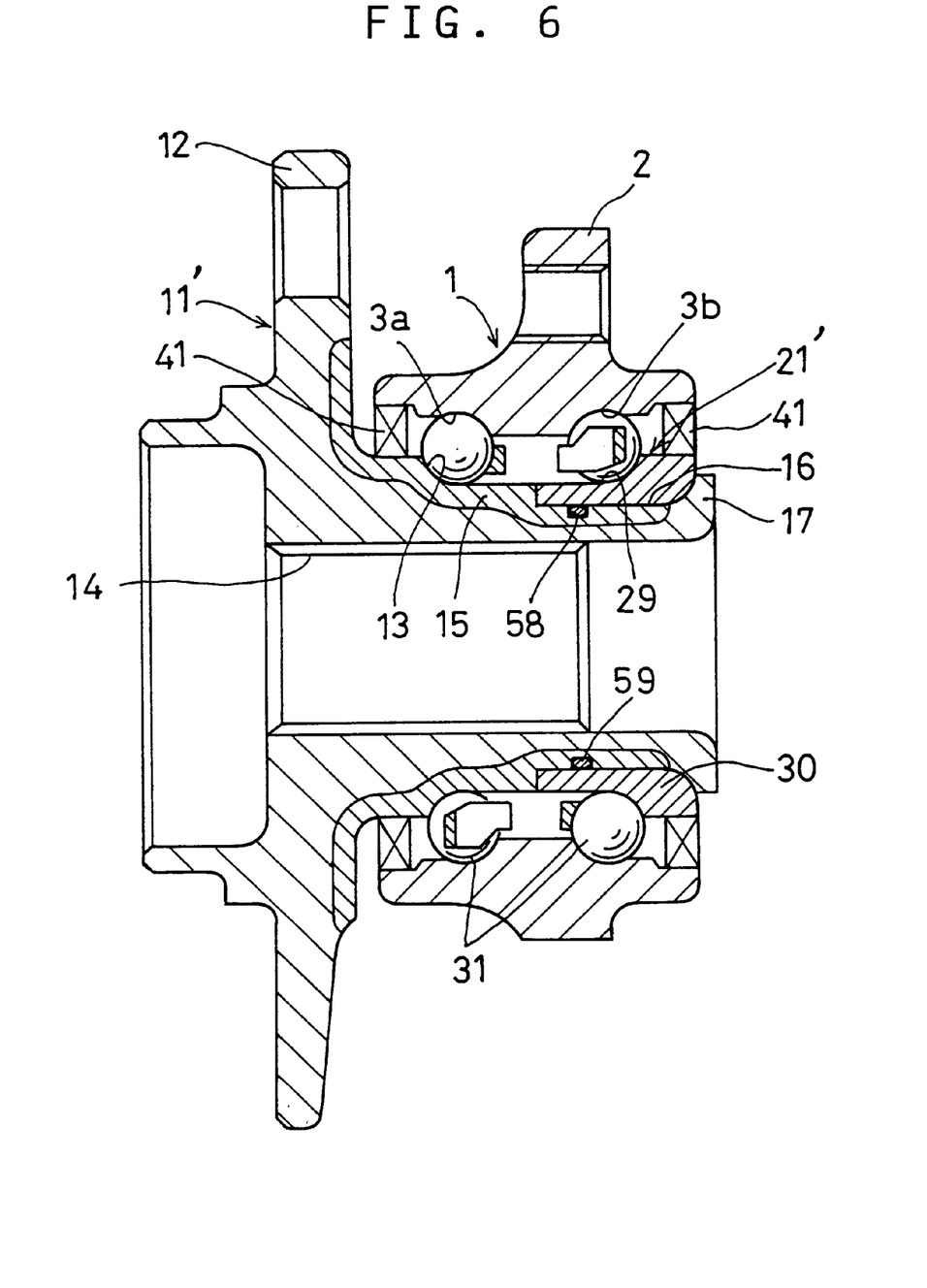
FIG. 6 is a vertical sectional front view showing a wheel bearing assembly of a fifth embodiment.

FIG. 6 shows a fifth embodiment of the wheel bearing assembly according to this invention. This wheel bearing assembly differs from the wheel bearing assembly shown in FIG. 1 only with regard to first and second inner members, 11' and 21', respectively. The wheel bearing assembly of this embodiment comprises an inner ring 30 having a raceway 29 on its outer periphery. The inner ring 30, which is the second inner member 21', is pressed onto a small-diameter bearing ring fitting surface 16 formed on an outer periphery of an inner end of the first inner member 11', and integrally coupled to the first inner member 11' by caulking the inner end of the first inner member 11'.

With the wheel bearing assembly having such a structure, an annular groove 58 is formed in the bearing ring fitting surface 16, and a seal ring 59 mounted in the annular groove 58 is resiliently brought into contact with an inner peripheral surface of the second inner member 21', while at the same time being in contact with a bottom surface of the groove to provide a seal between contacting fitting surfaces of the first inner member 11' and the inner ring 30, which is the second inner member 21'. As a material for the seal ring 59, one used for the seal ring 52 shown in FIG. 2 may be used.

A seal may be provided between the fitting surfaces of the first inner member 11' and the second inner member 21' by forming an annular groove in the inner peripheral surface of the second inner member 21' and mounting a seal ring in this annular groove. Material and heat treatment for the first inner member 11' of this wheel bearing assembly are substantially the same as those of the first inner member 11 shown in FIG. 1. But in order to caulk the inner end, heat treatment is carried out within a range of from a surface at a root of wheel-mounting flange 2 to a bearing ring fitting surface of the first inner member 11', and its inner end to be caulked is left unhardened.

Figure 7:
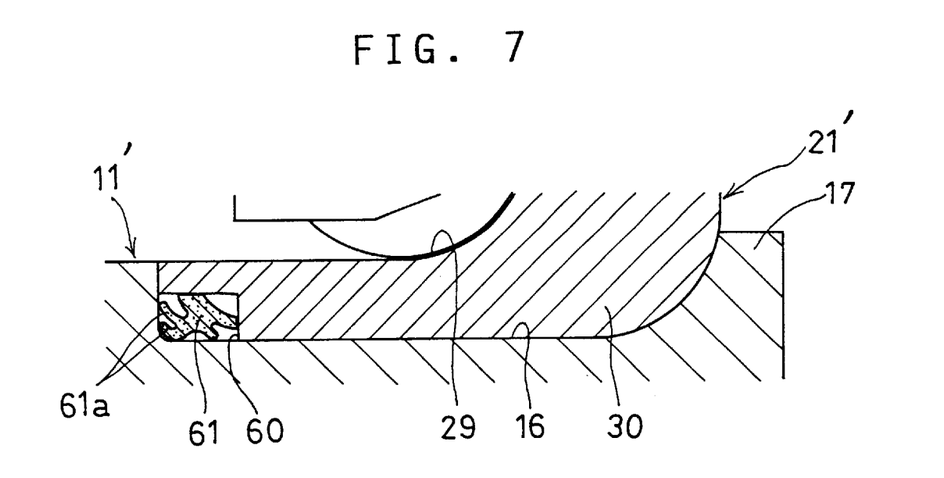
FIG. 7 is a sectional view showing a sealing member of a sixth embodiment.
Figure 8:
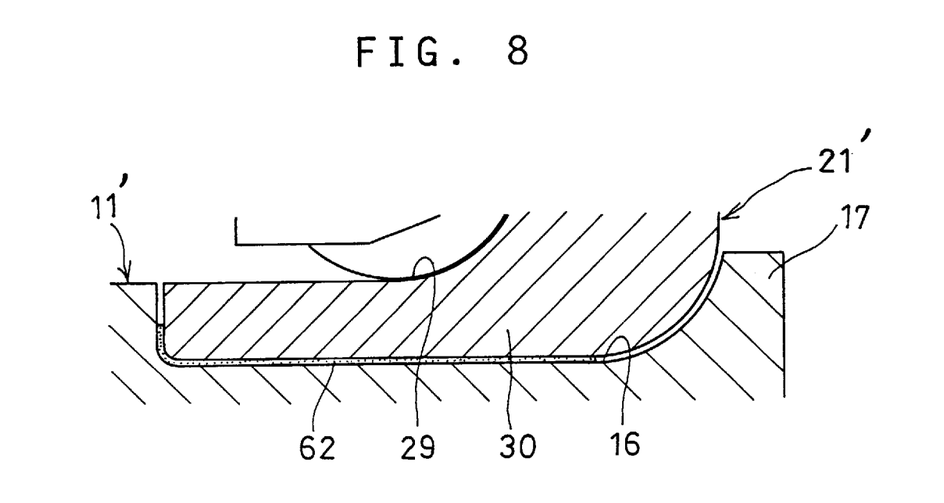
FIG. 8 is a sectional view showing a sealing member of a seventh embodiment.

FIGS. 7 and 8 are enlarged views of sealing members of sixth and seventh embodiments of the wheel bearing assembly according to this invention. These embodiments differ from the wheel bearing assembly shown in FIG. 6 only with regard to the sealing member between fitting surfaces. Thus, only the sealing members of these embodiments will be described.

As the sealing member of the wheel bearing assembly in the sixth embodiment shown in FIG. 7, a seal member 61 is fixed in a seal-mounting recess 60 formed in an inner peripheral portion of an outer end of second inner member 21'. The seal member 61 is fixed in the seal-mounting recess 60 with an adhesive, for example, and a plurality of seal lips 61a provided on the seal member 61 are brought into contact with an outer periphery of first inner member 11' to provide a seal between contacting fitting surfaces of the first and second inner members 11' and 21'. Also, instead of bonding, the seal member 61 may be fitted in the seal-mounting recess 60 with a slight interference between an inner wall of the seal-mounting recess 60 and the seal member 61. For material of the seal member 61, one shown for the seal member 54 of FIG. 3 may be used.

As the sealing member of the wheel bearing assembly in the seventh embodiment shown in FIG. 8, a sealing agent 62 is applied between fitting surfaces of first inner member 11' and second inner member 21' to provide a seal therebetween. Thickness of the sealing agent is exaggerated in FIG. 8. As the sealing agent 62, as with the sealing agent 57 shown in FIGS. 5A to 5C, a resin adhesive is preferable, and an anaerobic room temperature curing type adhesive is more preferable.

Any of the sealing members shown in FIGS. 6–8 can provide a seal between fitting surfaces of first inner member 11' and second inner member 21'. Thus, entry of muddy water, for example, into the bearing assembly through a space between the fitting surfaces is prevented.

In the embodiment shown in FIG. 6, a wheel bearing assembly for a driving wheel is shown which has the stem-inserting hole 14 in the form of a spline hole into which a stem of a constant-velocity joint (not shown) is inserted. But the wheel bearing assembly is not limited thereto, and may be a wheel bearing assembly for a non-driving wheel in which the first inner member 11' is formed with a circular hole, or has no hole and is solid.

Also in FIG. 6, a wheel bearing assembly in which the inner end of the first inner member 11' is caulked is shown. But the wheel bearing assembly may be a wheel bearing assembly in which the caulked portion 17 is omitted, with the inner ring 30 simply being pressed onto the bearing ring fitting surface on the first inner member. With a wheel bearing assembly for a non-driving wheel, instead of the caulked portion 17, the first inner member 11' and the inner ring 30, which is the second inner member 21', may be held in a coupled state by providing a threaded shaft on the inner end of the first inner member 11' and tightening a nut onto the threaded shaft. Also, in any of the embodiments, rolling elements in the form of balls are shown, but are not limited to balls. The rolling elements may be tapered rollers.

According to this invention, by providing a sealing member for providing a seal for between fitting surfaces of a first inner member and a second inner member, it is possible to prevent entry of muddy water into a bearing assembly through a gap between fitting surfaces, thus suppressing lowering of the life of the bearing assembly.

What is claimed is:

1. A wheel bearing assembly comprising:
    an outer member having on an outer periphery thereof a flange for being mounted to a vehicle body, and also having two raceways on an inner periphery thereof;
    a first inner member having on an outer periphery thereof a raceway radially opposing one of said two raceways on said inner periphery of said outer member;
    a second inner member having a first portion inserted into said first inner member with an outer periphery of said first portion opposing an inner periphery of said first inner member, and a second portion having on an outer periphery thereof a raceway radially opposing the other of said two raceways on said inner periphery of said outer member;
    rolling elements mounted between said raceway of said first inner member and said one of said two raceways of said outer member, and between said raceway of said second inner member and said other of said two raceways of said outer member;
    a first seal member for providing a seal between a first end of said inner periphery of said outer member and said outer periphery of said first inner member;
    a second seal member for providing a seal between a second end of said inner periphery of said outer member and said outer periphery of said second portion of said second inner member; and
    a sealing member provided in its entirety between said inner periphery of said first inner member and said outer periphery of said first portion of said second inner member for providing a seal therebetween.

2. The wheel bearing assembly according to claim 1, wherein said second inner member comprises an outer joint member of a constant-velocity joint, with said first portion of said second inner member comprising a stem of said outer joint member, said stem having a fitting shaft portion and a spline shaft portion, and said first inner member defines a stem-inserting hole having a fitting hole portion and a spline hole portion, such that said first portion of said second inner member being inserted into said first inner member comprises said fitting shaft portion being pressed into said fitting hole portion, and said spline shaft portion being fitted into said spline hole portion.

3. The wheel bearing assembly according to claim 2, wherein said stem-inserting hole is defined by an inner peripheral surface of said first inner member, and said sealing member comprises a seal ring mounted in an annular groove formed in one of said inner peripheral surface of said first inner member and an outer peripheral surface of said stem, so as to be in resilient contact with the other of said inner peripheral surface of said first inner member and said outer peripheral surface of said stem.

4. The wheel bearing assembly according to claim 3, wherein said inner peripheral surface of said first inner member comprises an inner cylindrical surface and said outer peripheral surface of said stem comprises an outer cylindrical surface in contact with said inner cylindrical surface of said first inner member, and said seal ring is positioned between said inner cylindrical surface of said first inner member and said outer cylindrical surface of said stem.

5. The wheel bearing assembly according to claim 3, wherein said seal ring is mounted in said annular groove so as to be positioned against a bottom surface of said annular groove.

6. The wheel bearing assembly according to claim 2, wherein said sealing member is mounted on an inner peripheral surface of said first inner member at an inner end thereof and includes plural seal lips in resilient contact with an outer peripheral surface of said first portion of said second inner member.

7. The wheel bearing assembly according to claim 2, wherein said stem-inserting hole is defined by an inner peripheral surface of said first inner member, and said sealing member comprises a sealing agent applied to said inner peripheral surface of said first inner member and an outer peripheral surface of said stem.

8. The wheel bearing assembly according to claim 7, wherein said inner peripheral surface of said first inner member comprises an inner cylindrical surface and said outer peripheral surface of said stem comprises an outer cylindrical surface, and said sealing agent is positioned between said inner cylindrical surface of said first inner member and said outer cylindrical surface of said stem.

9. The wheel bearing assembly according to claim 7, wherein said sealing agent comprises a resin adhesive.

10. The wheel bearing assembly according to claim 1, wherein said sealing member comprises a seal ring mounted in an annular groove formed in one of a peripheral surface of said first inner member and a peripheral surface of said first portion of said second inner member, so as to be in resilient contact with the other of said peripheral surface of said first inner member and said peripheral surface of said first portion of said second inner member.

11. The wheel bearing assembly according to claim 10, wherein said peripheral surface of said first inner member comprises a cylindrical surface and said peripheral surface of said first portion of said second inner member comprises a cylindrical surface in contact with said cylindrical surface of said first inner member, and said seal ring is positioned between said cylindrical surface of said first inner member and said cylindrical surface of said first portion of said second inner member.

12. The wheel bearing assembly according to claim 10, wherein said seal ring is mounted in said annular groove so as to be positioned against a bottom surface of said annular groove.

13. The wheel bearing assembly according to claim 11, wherein said sealing member is mounted on an inner peripheral portion of an inner end of said first inner member and includes plural seal lips in resilient contact with a surface of said first portion of said second inner member.

14. The wheel bearing assembly according to claim 1, wherein said sealing member comprises a sealing agent applied to a peripheral surface of said first inner member and a peripheral surface of said first portion of said second inner member.

15. The wheel bearing assembly according to claim 14, wherein said sealing agent comprises a resin adhesive.

16. The wheel bearing assembly according to claim 1, further comprising:

a caulked portion separate from said sealing member, wherein said caulked portion is defined by an end of said first portion of said second inner member being pressed against an end of said first inner member such that said first inner member and said second inner member are prevented from moving axially relative to one another.

17. A wheel bearing assembly comprising:

an outer member having on an outer periphery thereof a flange for being mounted to a vehicle body, and also having two raceways on an inner periphery thereof;

a first inner member having a first portion having on an outer periphery thereof a raceway radially opposing one of said two raceways on said inner periphery of said outer member, and a second small-diameter portion;

a second inner member fitted on said second small-diameter portion of said first inner member with an outer periphery of said second small-diameter portion of said first inner member opposing an inner periphery of said second inner member, and having on an outer periphery thereof a raceway radially opposing the other of said two raceways on said inner periphery of said outer member;

rolling elements mounted between said raceway of said first inner member and said one of said two raceways of said outer member, and between said raceway of said second inner member and said other of said two raceways of said outer member;

a first seal member for providing a seal between a first end of said inner periphery of said outer member and said outer periphery of said first portion of said first inner member;

a second seal member for providing a seal between a second end of said inner periphery of said outer member and said outer periphery of said second inner member; and a sealing member provided in its entirety between said inner periphery of said second inner member and said outer periphery of said second small-diameter portion of said first inner member for providing a seal therebetween.

18. The wheel bearing assembly according to claim 17, wherein said second inner member comprises an inner ring pressed onto said second small-diameter portion, with said second small-diameter portion being at one end of said first inner member.

19. The wheel bearing assembly according to claim 18, wherein said sealing member comprises a seal ring mounted in an annular groove formed in one of an outer peripheral surface of said first inner member and an inner peripheral surface of said inner ring, so as to be in resilient contact with the other of said outer peripheral surface of said first inner member and said inner peripheral surface of said inner ring.

20. The wheel bearing assembly according to claim 19, wherein said outer peripheral surface of said first inner member comprises an outer cylindrical surface and said inner peripheral surface of said inner ring comprises an inner cylindrical surface in contact with said outer cylindrical surface of said first inner member, and said seal ring is positioned between said outer cylindrical surface of said first inner member and said inner cylindrical surface of said inner ring.

21. The wheel bearing assembly according to claim 19, wherein said seal ring is mounted in said annular groove so as to be positioned against a bottom surface of said annular groove.

22. The wheel bearing assembly according to claim 18, wherein said sealing member is mounted on an inner peripheral portion of an outer end of said inner ring and includes plural seal lips in resilient contact with a surface of said first inner member.

23. The wheel bearing assembly according to claim 18, wherein said sealing member comprises a sealing agent applied to an outer peripheral surface of said first inner member and an inner peripheral surface of said inner ring.

24. The wheel bearing assembly according to claim 23, wherein said outer peripheral surface of said first inner member comprises an outer cylindrical surface and said inner peripheral surface of said inner ring comprises an inner cylindrical surface, and said sealing agent is positioned between said outer cylindrical surface of said first inner member and said inner cylindrical surface of said inner ring.

25. The wheel bearing assembly according to claim 23, wherein said sealing agent comprises a resin adhesive.

26. The wheel bearing assembly according to claim 17, wherein said sealing member comprises a seal ring mounted in an annular groove formed in one of an outer peripheral surface of said first inner member and an inner peripheral surface of said second inner member, so as to be in resilient contact with the other of said outer peripheral surface of said first inner member and said inner peripheral surface of said second inner member.

27. The wheel bearing assembly according to claim 26, wherein said outer peripheral surface of said first inner member comprises an outer cylindrical surface and said inner peripheral surface of said second inner member comprises an inner cylindrical surface in contact with said outer cylindrical surface of said first inner member, and said seal ring is positioned between said outer cylindrical surface of said first inner member and said inner cylindrical surface of said second inner member.

28. The wheel bearing assembly according to claim 26, wherein said seal ring is mounted in said annular groove so as to be positioned against a bottom surface of said annular groove.

29. The wheel bearing assembly according to claim 17, wherein said sealing member is mounted on an inner peripheral portion of an outer end of said second inner member and includes plural seal lips in resilient contact with a surface of said first inner member.

30. The wheel bearing assembly according to claim 17, wherein said sealing member comprises a sealing agent applied to an outer peripheral surface of said first inner member and an inner peripheral surface of said second inner member.

31. The wheel bearing assembly according to claim 30, wherein said sealing agent comprises a resin adhesive.

32. The wheel bearing assembly according to claim 17, further comprising:

a caulked portion separate from said sealing member, wherein said caulked portion is defined by an end of said second small-diameter portion of said first inner member being pressed against an end of said second inner member such that said first inner member and said second inner member are prevented from moving axially relative to one another.

* * * * *